Aug. 6, 1935.  H. M. COLLINS  2,010,534
DRINK MIXER
Filed Sept. 14, 1933   3 Sheets-Sheet 1
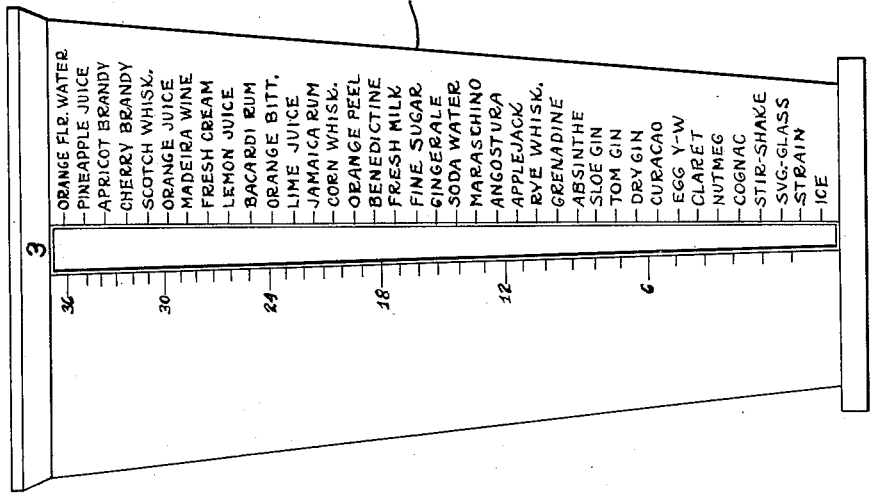
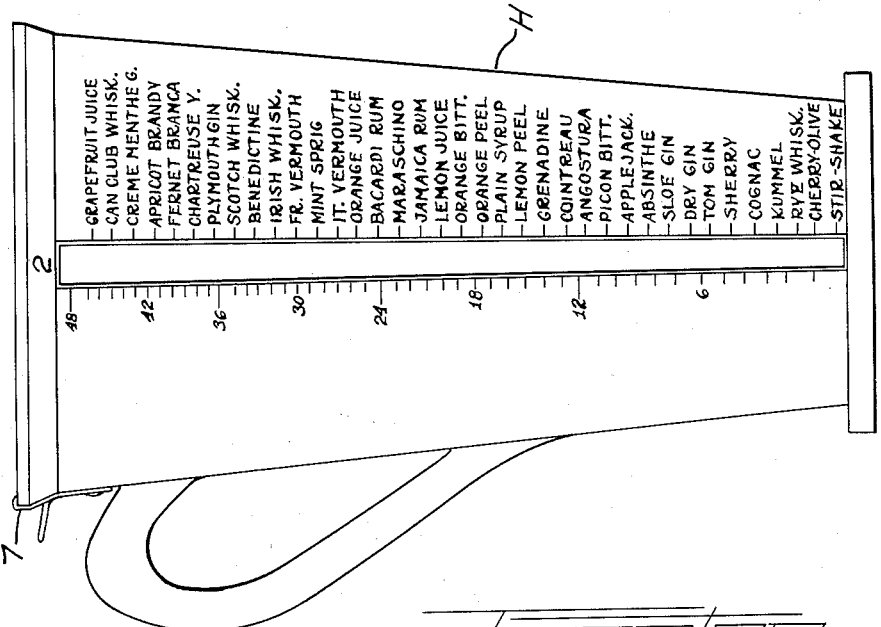
Inventor
HAROLD M. COLLINS Aug. 6, 1935.   H. M. COLLINS   2,010,534
DRINK MIXER
Filed Sept. 14, 1933   3 Sheets-Sheet 2
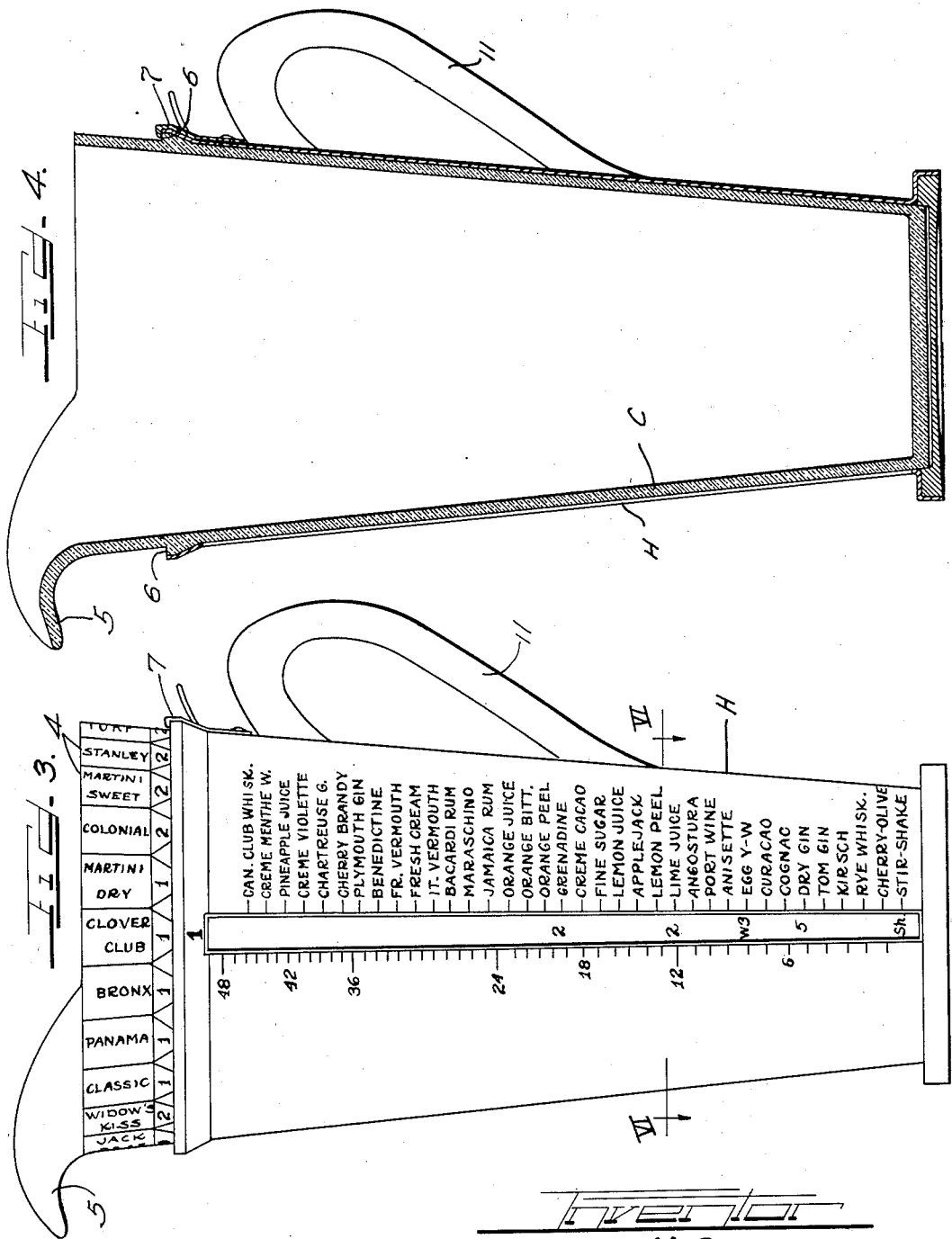
Inventor
HAROLD M. COLLINS.

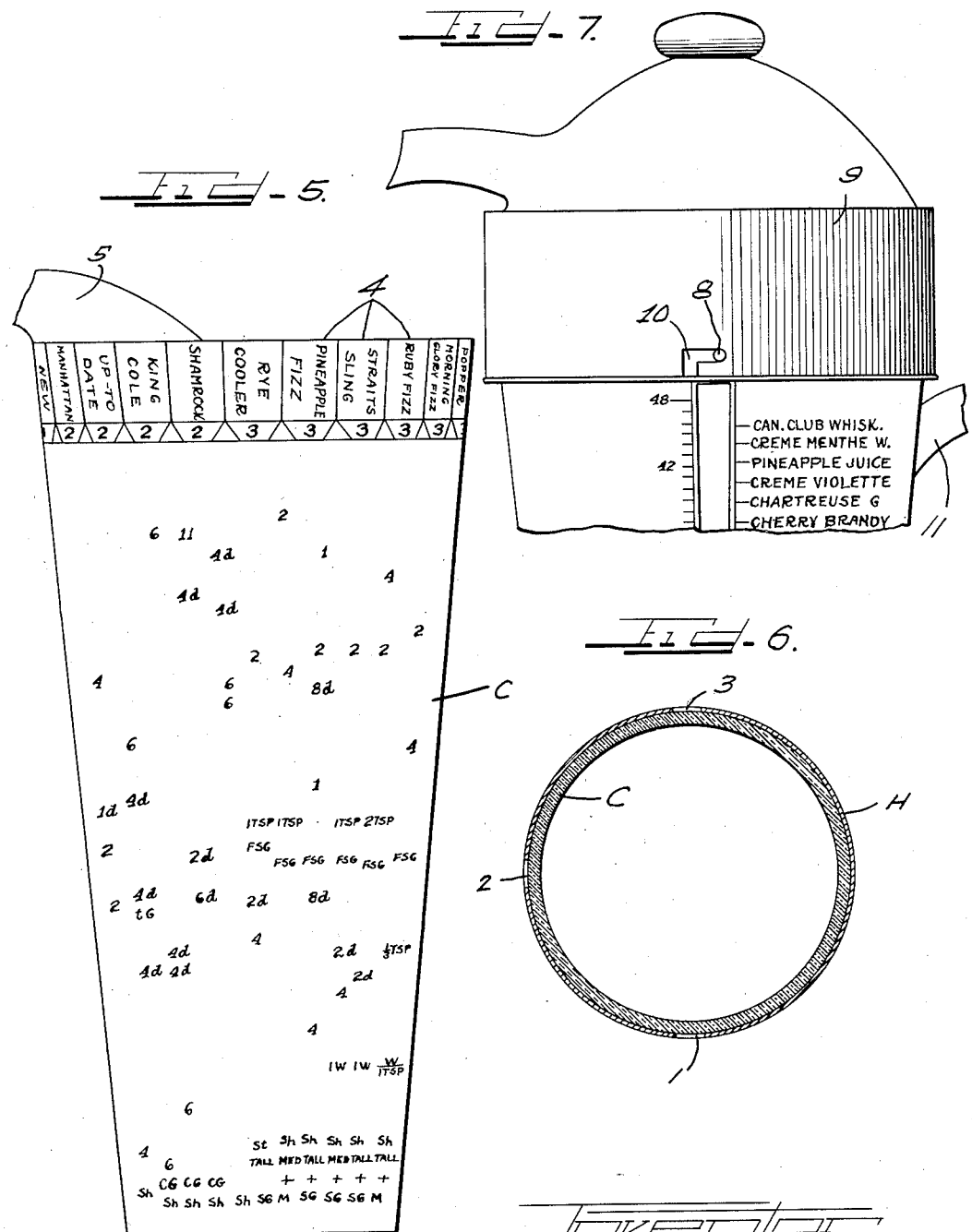

Patented Aug. 6, 1935

2,010,534

UNITED STATES PATENT OFFICE 2,010,534

DRINK MIXER

Harold M. Collins, Marion, Va.

Application September 14, 1933, Serial No. 689,381

5 Claims. (Cl. 220—1)

This invention relates to a drink mixer comprising a transparent container and a holder therefor designed when brought into the proper relation, to indicate the ingredients and the necessary quantity thereof for a given drink.

The invention comprises the novel structure and combination of parts hereinafter described and more particularly pointed out and defined in the appended claims.

In the accompanying drawings which illustrate a preferred form of this invention and in which similar reference numbers refer to similar features in the different views.

Figure 1 is an elevational view of the holder, showing one of the vertical slots therein.

Figure 2 is an elevational view of the holder in a different position showing another vertical slot.

Figure 3 is an elevational view of the holder, showing another vertical slot and with the transparent container therein.

Figure 4 is a vertical sectional view through the combined holder and container.

Figure 5 is an elevational view of the transparent container.

Figure 6 is a sectional view taken upon the line VI—VI of Figure 3.

Figure 7 is a fragmentary elevational view of a modified form of mixer.

In the drawings, there is shown a holder H which preferably consists of metal and which is provided with a plurality of vertical slots; three slots being illustrated in the present instance, and being designated as 1, 2 and 3. Upon one side of each slot are names of ingredients for compounding a drink, and upon the opposite side of each slot there is a scale for measuring such ingredients.

The container C which may consist of glass or any suitable transparent material, is adapted to project a suitable distance above the holder when positioned therein, as shown in Figure 3. This projecting portion of the container contains the names 4 of a plurality of drinks with the number of a slot 1, 2 or 3 below each name. The container may be provided with a pouring spout 5. Below each name of a drink on the container are markings and numbers at proper elevations from the bottom to coincide with certain ingredients on the holder when the container is placed therein.

To mix a certain drink, for example a Clover club cocktail, the container is inserted in the holder and rotated until the words, "Clover club" bearing the slot number 1 is above the slot 1 in the holder, as shown in Figure 3. The number below the name of each drink indicates the proper slot to which the name of the drink on the container must be rotated to exhibit the proper ingredients and the quantity thereof for a predetermined volume. The container may, of course, be designed for mixing any desired volume.

When the container is rotated to register the words, "Clover club" with the slot 1, the ingredients and quantity thereof will become visible through such slot as shown in Figure 3. Calling the distance between any two lines on the scale as a unit of volume, it will be noted that the numeral "2" appears opposite the ingredient "Grenadine" and indicates that two units of volume of such ingredient are required. The numeral "2" also appears opposite the ingredient "Lime juice" and indicates that two units of that ingredient are required. The notation W3 appears opposite the ingredient "egg white" and indicates that three units of such ingredient are required, while the numeral "5" opposite "dry gin" indicates that five units of that ingredient are required. At the bottom of the slot appears the notation "sh" which indicates that the contents of the container should be shaken.

Thus it will be apparent that this mixer not only indicates the ingredients that are required for each drink, but also indicates the quantity thereof so that any inexperienced person can readily concoct the different drinks. For as each ingredient is put into the container, it can be readily observed as it rises therein through the slot in the holder and the scale will indicate when the proper amount is reached.

In order to hold the container properly nested in the holder, the same is preferably provided with a shoulder 6 as shown in Figure 4 and the holder H is provided with a spring clip 7 that engages over such shoulder as shown in Figures 3 and 4.

It will, of course, be understood that a number of different containers may be used with the holder for increasing the number of drinks to be concocted. In instances where it is desired to vigorously shake the ingredients, the container may be formed without the spout 5 and the holder may be provided with pins 8 (Fig. 7) spaced therearound, upon which a cover 9 may be positioned. The cover 9 is shown as provided with a bayonet slot 10 for receiving each pin. The holder is also preferably provided with a handle 11.

The mixer involving this invention possesses meritorious advantages over others heretofore in use in that it not only indicates the ingredients for concocting a drink, but it also gives the amount of each ingredient required. This makes it possible for anyone to concoct the different drinks with such a mixer before him.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a drink mixer, a holder having a plurality of spaced vertical slots with the names of drink ingredients along one margin of each slot and a scale along the other margin of each slot, in combination with a transparent container having names of different drinks arranged circumferentially upon the upper portion thereof and nested in said holder, said container having an indicia below the name of each drink for indicating a certain slot in the holder, and having notations thereon indicating the quantity of each ingredient required for a given drink arranged in a vertical line for rotation into registry with a slot, said notations being properly spaced for alinement with the respective ingredients.

2. In a drink mixer, a holder having a plurality of vertical slots, with the names of ingredients along one vertical margin of each slot and a scale along the other vertical margin of each slot, a transparent container nested in said holder and extending thereabove, the extending portion of said container having the names of drinks thereon and having slot indicating indicia below said names for indicating certain slots in said holder, said container having quantity indicating indicia upon the body portion thereof adapted when said holder is rotated for registering with a slot therein.

3. In a drink mixer, a pair of relatively rotatable members, the outer member having a plurality of spaced vertical slots and the inner member having indicia visible through said slots, one vertical margin of each slot having names of drink ingredients arranged therealong, the inner member having the names of drinks thereon visible above said outer member, and having a slot indicating indicia below each name for the purpose set forth, said container having quantity indicating indicia visible through a slot.

4. In a drink mixer, a pair of relatively rotatable members, the outer member having a plurality of vertical slots with the names of drink ingredients along one vertical margin of each slot, and a scale along the other margin of each slot, the inner member being nested in said outer member and extending thereabove, the extended portion of said inner member having the names of drinks thereon, with a slot indicating notation associated with each name, the body of said inner member having means thereon for indicating the quantity of ingredients for a drink visible through a slot in said outer member.

5. In a drink mixer, a pair of relatively rotatable members, one of said members having a plurality of slots with the names of drink ingredients along one margin of said slot, the other member having quantity notations thereon visible through said slots and having names of drinks thereon with a notation associated with the name of each drink for indicating a certain slot.

HAROLD M. COLLINS.